CARRIER-OPERATED RELAY CIRCUIT
Filed April 23, 1951
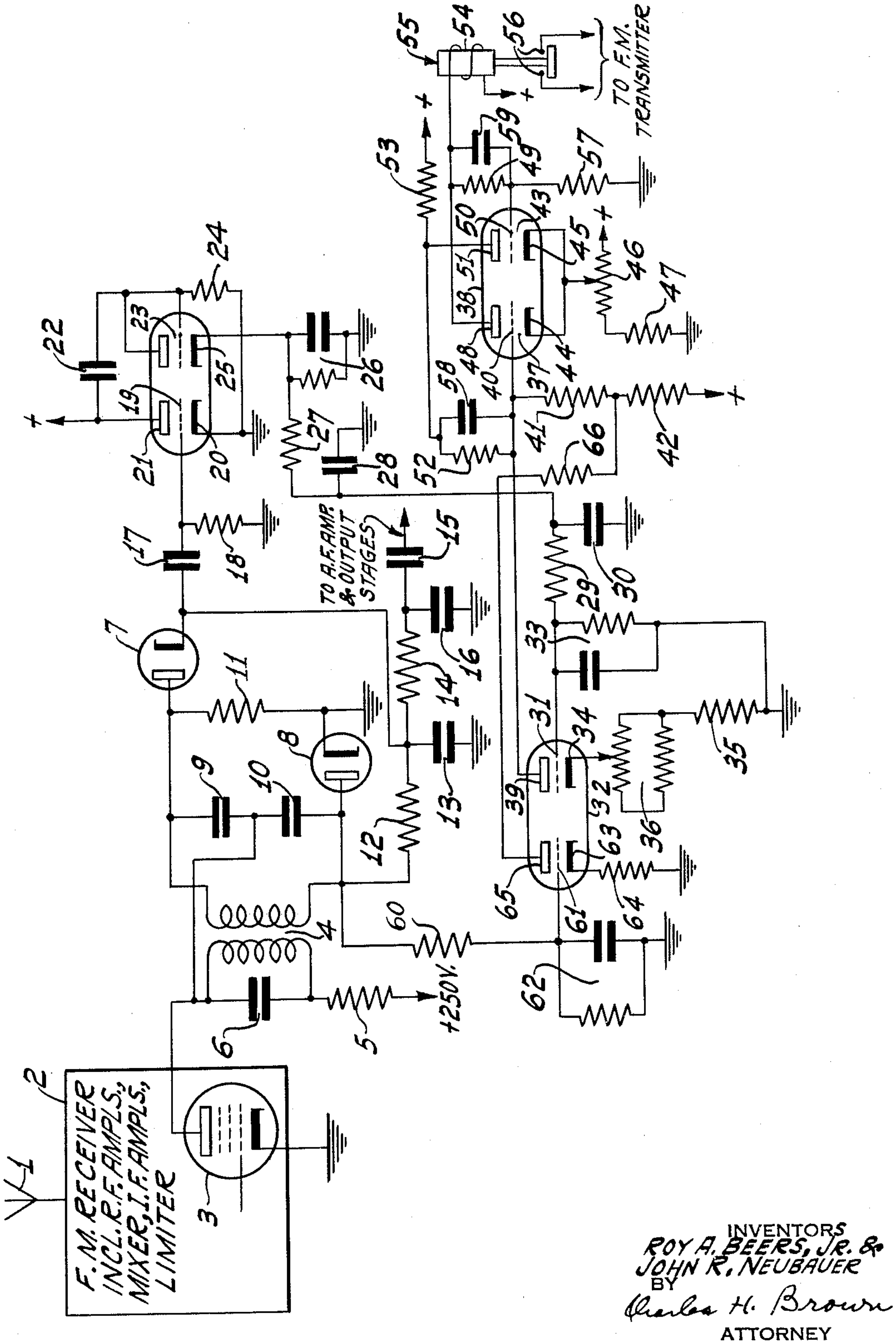
INVENTORS
ROY A. BEERS, JR. &
JOHN R. NEUBAUER
BY
Charles H. Brown
ATTORNEY United States Patent Office 2,726,325
Patented Dec. 6, 1955

2,726,325

CARRIER-OPERATED RELAY CIRCUIT

Roy A. Beers, Jr., Audubon, and John R. Neubauer, Collingswood, N. J., assignors to Radio Corporation of America, a corporation of Delaware Application April 23, 1951, Serial No. 222,504
12 Claims. (Cl. 250—6)

This invention relates to a carrier-operated relay circuit, and more particularly to a relay circuit useful in frequency modulation (FM) communication systems. This invention is primarily intended for use in a mobile FM communication system, although the principles of the invention can be applied to any type of radio relaying utilizing frequency or phase modulation.

Mobile transmitter-receiver units are required to operate over a wide variety of terrain conditions, including mountainous areas. At the same time, communication must be maintained between mobile units separated by rather large distances, or between one or more mobile units and a fixed base station located a rather large distance therefrom, as for example in state-wide police radio systems. Both of these requirements which exist in mobile communication systems call for one or more relay stations situated between the stations which are in communication with each other. Such relay stations are generally unattended and contain at least one FM transmitter and one FM receiver. The receiver at the relay station receives the signal to be relayed and the transmitter thereat retransmits such signal, on a different frequency. Because the system is a mobile communication system, the relay stations must of necessity be linked by radio with the mobile stations. Also, for purposes of economy it is highly desirable that the relay station transmitter be turned on only when a signal is received thereby for retransmission.

According to the present invention, a reliable and relatively inexpensive control system is provided at the relay station for turning the transmitter thereat on and off, the transmitter being turned on when a signal is received and turned off in the absence of a received signal. Such a control system is responsive to the presence of a carrier at the relay station, so that it may be termed a carrier-operated control system and, since the system actually operates a relay which controls the transmitter, may be termed a carrier-operated relay circuit.

The carrier-operated relay for controlling the transmitter, as applied to FM communication systems of the above type, generally utilizes the rectified receiver noise which is characteristic of high-gain FM receivers, when no carrier is present, to hold the relay de-energized and the transmitter thereby turned off. In the presence of a carrier, a quieting effect takes place, due to the action of the limiter stages. The noise voltage output, rectified, therefore varies in proportion to the strength of signal received, up to the complete saturation of the limiter circuit. When the control voltage resulting from the rectified noise decreases in the presence of a carrier, the transmitter-controlling relay is energized to turn on the transmitter. For a typical example, when referred to a noise output at the receiver load of 20 db, a signal of 0.5 microvolt at the antenna will reduce the noise to zero db. This is defined as the quieting sensitivity of the receiver and is generally accepted as a true indication of receiver performance. If this noise is amplified and then rectified, a D. C. component of this quieting effect will be realized; this D. C. component will be proportional to the signal input of the receiver.

This noise voltage, rectified, which serves as a control voltage, will vary in the same manner (as it does when carrier is present) if the action of the receiver due to circuit failure allows the noise voltage to decrease, as when the receiver completely fails or when the over-all gain thereof is reduced to an unusable value. Typical causes of this receiver action might be defective tubes, shorted or open circuit components, etc. Heretofore, when the noise voltage output, rectified (used as a control voltage) decreases due to receiver failure or defects, the transmitter-controlling relay is energized to turn on the transmitter, and "transmitter lock-on" then occurs. The transmitter at the relaying station then radiates continously. This has a tendency to block the communication system, because in such a mobile communication system there are normally a large number of transmitters and receivers on the same frequency; other transmitters often then cannot be heard as they may be blocked out by the locked-on transmitter if its signal is stronger at any particular receiving location. Of course, under these circumstances the locked-on transmitter is incapable of transmitting any intelligence, since its interconnected receiver is defective and is incapable of properly receiving any intelligence for retransmission by the relaying station whose transmitter is locked on. It is therefore highly desirable to prevent transmitter lock-on from arising as a result of receiver failure, or when the over-all gain of the receiver is reduced to an unusable value.

One of the main objects of this invention is to device an arrangement for preventing transmitter lock-on in an FM communication system, due to receiver failure.

Another object is to devise a carrier-operated relay circuit for controlling a transmitter which operates to lock out the relay, and thereby prevent the transmitter from being energized, if the receiver through which the relay is normally operated becomes defective.

An additional object is to devise a lock-out circuit for a carrier-operated relay amplifier.

Still another object is to devise a lock-out circuit for a carrier-operated transmitter-controlling relay at a relaying station of an FM communication system.

The foregoing and other objects of the invention will be best understood from the following description of an exemplification thereof, reference being had to the accompanying drawing, wherein the single figure is a diagrammatic representation of a circuit arrangement according to the present invention.

Broadly speaking, the apparatus in the figure is located at a relaying station of an FM communication system. A portion of the FM receiver at such station is illustrated; the FM transmitter, which relays or retransmits intelligence received by the receiver, is not shown in the figure but is controlled by the relay illustrated. A receiving antenna 1 picks up frequency-modulated intelligence transmitted from a remote station and feeds the same to an FM receiver 2 which includes in cascade radio frequency amplifier stages, a mixer stage also fed by a local heterodyne oscillator, intermediate frequency amplifier stages and a plurality of limiter stages the final one of which includes a pentode vacuum tube 3 the output circuit of which is shown. The anode of limiter stage tube 3 is coupled to the positive terminal of a source of unidirectional potential (250 volts) through the primary winding of a transformer 4 and a resistor 5; the primary winding of said transformer is tuned by a parallel capacitor 6. In order to couple the limited output of limiter stage tube 3 to a following discriminator stage, opposite ends of the secondary of transformer 4 are connected to the respective anodes of a pair of diode vacuum tubes 7 and 8. The secondary of this transformer is shunted by a pair of series-connected capacitors 9 and 10 and the common junction between these capacitors is connected directly to the anode of tube 3; the cathode of tube 3 is connected to ground. The anode of diode 7 is connected through a resistor 11 to ground, while the cathode of diode 8 is grounded.

To complete the output connections of the discriminator stage including tubes 7 and 8, the lower end of the secondary of transformer 4 is connected through a resistor 12 to the cathode of diode 7, a bypass capacitor 13 being connected between the cathode end of this resistor and ground. The audio frequency output of the discriminator is fed from the cathode of diode 7 through a resistor 14 and a capacitor 15 to the audio frequency amplifier and output stages of the receiver (not shown), a capacitor 16 being connected from the capacitor 15 end of resistor 14 to ground.

The high frequency noise component of the output of the discriminator is fed through a coupling capacitor 17 over a leak resistor 18 to the input grid 19 of a noise amplifier and rectifier twin triode tube the amplifier cathode 20 of which is grounded and the amplifier anode 21 of which is connected through a coupling capacitor 22 to the anode and grid of the rectifier diode-connected triode 23, a leak resistor 24 being connected between the anode-grid side of capacitor 22 and ground. In order to properly separate the noise output of the discriminator from the audio frequency output thereof, capacitor 17 may have a capacitance approximately one one-hundredth as great as that of capacitor 15. The cathode 25 of diode-connected vacuum triode 23 is connected to ground by means of a parallel resistance-capacitance network 26. The rectified output of rectifier-connected triode 23 is taken off from cathode 25 by means of a series resistor 27, bypassed by a capacitor 28, and is applied over a series resistor 29 and bypass capacitor 30 to the control grid 31 of the right-hand triode of a twin triode vacuum tube 32. A parallel resistance-capacitance biasing network 33 is connected between grid 31 and ground, while the right-hand cathode 34 is connected to ground through a series resistor 35 and a variable resistor arrangement 36.

The right-hand triode of tube 32 is connected as a part of the grid bias system of the left-hand triode 37 of a pair of triodes in a twin triode vacuum tube 38 which pair are connected as a bistable locking or trigger circuit in a manner to be described hereinafter, by means of a lead extending from right-hand anode 39 of tube 32 directly to grid 40 of triode 37 and also by means of a lead extending from grid 40 through a pair of series-connected resistors 41 and 42 to a positive source of unidirectional potential, having a value of 150 volts, for example. The left-hand triode 37 and the right-hand triode 43 of tube 38 are connected in a bistable locking circuit or trigger circuit (that is, one having two degrees of electrical stability) rather similar to the well-known Eccles-Jordan circuit and to the circuit disclosed in the Finch expired Patent #1,844,950, dated February 16, 1932. For this purpose, the two cathodes 44 and 45 of triodes 37 and 43, respectively, are connected together and to a potentiometric biasing arrangement consisting of a potentiometer 46 (having a movable tap thereon connected to the cathodes) and a resistor 47 connected in series between a source of positive potential and ground. The grids and anodes of triodes 37 and 43 are cross-coupled through resistors; anode 48 of triode 37 is connected through resistor 49 to grid 50 of triode 43, while anode 51 of triode 43 is connected through resistor 52 to grid 40 of triode 37. Positive anode potential is supplied through resistor 53 to anode 51, while positive anode potential is supplied through the winding 54 of a relay 55 to anode 48. Relay 55 is the relay to be controlled by the circuit of this invention.

The contacts 56 of relay 55 are connected to the FM transmitter which is located at the relaying station and which is to be controlled by relay 55 in response to the signal received by FM receiver 2; these contacts are open when relay 55 is de-energized and, when closed due to energization of such relay, turn on the transmitter. A resistor 57 is connected between grid 50 and ground.

The triodes 37 and 43 are connected in such a manner that a change from one of two stable conditions of current and voltage to the other, and vice versa, can be produced by a very small change in the potential of the grid of either triode. An increase of anode current in the first triode structure 37 causes a decrease in the bias, or a more negative bias, on the grid of the second triode structure 43. The action is cumulative and the anode current of the second triode falls to zero while the anode current of the first triode reaches a maximum value determined by the load and the anode voltage. The action can be reversed by decreasing the anode current in the first triode 37 beyond a given critical value, whereupon such anode current will fall to zero, due to the increase in bias on the grid 50 and the consequent increase of anode current in triode 43 and the resultant decrease in bias on the grid 40 of the first triode 37. This critical value of current is established by the operating current and voltage used. The cross-couplings between the anodes and grids of triodes 37 and 43 must be such that the grids operate at or near cut-off value.

The anode-grid interelectrode capacitances of the triodes tend to stop the cumulative action, since these capacitive couplings influence the respective grids to change potential in the same direction as their corresponding anodes. These effects are avoided by connecting decoupling capacitors from the grid of the first triode to the anode of the second triode and from the grid of the second triode to the anode of the first triode; capacitor 58 is connected from grid 40 to anode 51 while capacitor 59 is connected from grid 50 to anode 48. Thus, capacitor 58 is connected across resistor 52 and capacitor 59 is connected across resistor 49. Since each external capacitor requires longer to charge and discharge than the corresponding interelectrode capacitance, the voltage change in each anode-grid circuit is substantially instantaneous.

In the absence of a received signal in receiver 2, the limiters in such receiver, including limiter 3, are saturated with noise and consequently there is a large noise output voltage from discriminator tubes 7 and 8. The high frequency portion of this noise voltage is fed through capacitor 17 and is amplified and rectified by the tube including elements 19—21 and 23, producing a positive voltage which is applied to grid 31. In the absence of a carrier in receiver 2, this voltage on grid 31 is about ten volts positive. This means that maximum anode current is flowing at anode 39, decreasing the bias on the grid 40 (which is connected directly to anode 39) or putting a more negative bias on this grid. This, due to the trigger circuit action previously described, causes the anode current in triode 37 to fall to zero, that in triode 43 to go to its maximum value; this de-energizes the relay 55, which is in the anode circuit of triode 37, thus turning off the FM transmitter in the absence of a received signal.

Now, when a signal is received by receiver 2, for example one having a signal level as low as 0.25 microvolt, the receiver noise quiets, due to the FM receiver action previously described, and the positive voltage applied to grid 31 decreases, for example to 0.9 volt. Since this control grid thus becomes less positive, the anode current at anode 39 decreases, so that the anode voltage thereat becomes higher. The potential on grid 40 then increases, causing the anode current in triode 37 to increase, thus triggering the trigger circuit 37, 43 and causing the current flow to substantially instantaneously switch from triode 43 to triode 37. This means that the anode current in triode 43 falls from its maximum value to zero and that in triode 37 rises from zero to its maximum value. This action energizes relay 55, which is in the anode circuit of triode 37, thus turning on the FM transmitter in the presence of a received signal, or in other words turning on such transmitter when a signal is received in receiver 2. The relay 55 remains energized, and the transmitter turned on, as long as a signal is being received in receiver 2, and is turned off in the absence of a received signal.

It will be noted that the receiver noise, rectified, which is present when no carrier is being received, holds the relay 55 de-energized and that the noise-quieting effect of a received carrier causes the control voltage resulting from the noise to decrease, energizing relay 55. In other words, the noise voltage holds relay 55 de-energized. Now, if circuit failure in the receiver acts so as to allow the noise voltage to decrease, the control voltage at grid 31 would decrease in the same manner as when a signal is being received. This receiver circuit failure might be caused by defective tubes, shorted or open circuit components, etc., and would thus cause relay 55 to be energized, locking on the transmitter and causing blocking of the communication system. This is quite undesirable and according to this invention, means is provided to prevent transmitter lock-on due to receiver failure.

One of the discriminator anodes, for example the anode of diode 8, is connected through an isolation resistor 60 to grid 61 of the left-hand triode section of tube 32, a parallel resistance-capacitance network 62 being provided between this grid and ground for biasing purposes. Alternatively, this connection to grid 61 could be made from a limiter stage grid return in the receiver if desired. The cathode 63 of this triode is connected through a resistor 64 to ground, while the anode 65 of this triode is connected through a resistor 66 to the junction point between resistors 41 and 42. Thus, the left-hand triode section of tube 32 is connected essentially in parallel with the right-hand triode section of this tube, except of course for the control grid 61 of the left-hand section.

The anode of discriminator diode 8 (or the receiver limiter grid, if the lead to grid 61 is connected to the limiter grid) is always saturated with noise or rectified signal under normal conditions, that is under no-signal and signal-received conditions, so that the bias applied to grid 61 does not change appreciably from no-signal to signal-received condition. The negative bias voltage applied to grid 61 from the anode of discriminator diode 8 is on the order of 12 volts negative and is sufficiently negative to cause the left-hand triode of tube 32 to be cut off under all normal operating conditions, when the receiver is in proper operating condition. Under these normal operating conditions, then, the left-hand triode of tube 32 is cut off and has no effect on the operation of relay 55 by the trigger control tube (the right-hand triode of tube 32), in the manner previously described.

Since the limiter grid current or the discriminator anode rectified output is dependent on a reasonable amount of receiver sensitivity, receiver failure produces a large change in the available output of these stages. Any predetermined loss of sensitivity of the receiver causes the negative bias potential applied to grid 61 to drop to a value on the order of two volts negative. As previously stated, when the receiver fails the positive control voltage applied to grid 31 fails also, or at least decreases considerably. However, under these circumstances the negative bias applied to grid 61 also disappears, or at least drops considerably. This causes the left-hand triode of tube 32 to draw more current. This increased anode current at anode 65 is sufficient to decrease the potential on grid 40 (to which anode 65 is connected through resistors 66 and 41) enough to keep the anode current in triode 37 at zero, thus preventing this triode from conducting to energize relay 55. Therefore, relay 55 remains de-energized and the transmitter turned off. Without this negative bias potential derived from the receiver discriminator anode and applied to the left-hand triode of tube 32 in the manner described, if the receiver failed, which in turn would cause the rectified noise voltage from the cathode 25 to decrease considerably toward zero value, the relay 55 would not be disabled and held de-energized in the manner described, but instead would operate or be energized and would turn on the transmitter. Thus, it will be seen that transmitter lock-on due to receiver failure is impossible with the arrangement of this invention. As a result, the transmitter does not continuously radiate, as it would do if relay 55 were energized under these conditions, and the communication system is not blocked.

Values of certain of the circuit components are given below by way of example. It is to be understood that these values are given only for illustrative purposes and are not to be deemed as limiting the invention thereto in any way.

| | |
|---|---|
| Tube **32** | Type 12AT7. |
| Tube **38** | Type 12AT7. |
| Resistor **29** | 1 megohm. |
| Resistor **35** | 1200 ohms. |
| Resistor **41** | 47,000 ohms. |
| Resistor **42** | 47,000 ohms. |
| Resistor **47** | 4,700 ohms. |
| Resistor **49** | 270,000 ohms. |
| Resistor **52** | 270,000 ohms. |
| Resistor **53** | 10,000 ohms. |
| Resistor **57** | 390,000 ohms. |
| Resistor **60** | 1 megohm. |
| Resistor **64** | 150 ohms. |
| Resistor **66** | 47,000 ohms. |
| Capacitor **30** | 0.02 mfd. |
| Capacitor **58** | 47 mmfd. |
| Capacitor **59** | 47 mmfd. |

What we claim to be our invention is as follows:

1. In a communication system, a receiver for frequency modulated waves, means for rectifying the noise output of said receiver, a relay having two conditions of energization, means responsive solely to said rectified noise output for causing said relay to assume one of said conditions of energization in response to a predetermined decrease in the amplitude of said rectified noise output and for causing said relay to assume said other condition of energization in response to rectified noise output above a predetermined amplitude, and other means responsive solely to component failure in said receiver for controlling the energization of said relay.

2. In a communication system, a receiver for frequency modulated waves, means for rectifying the noise output of said receiver, a transmitter-controlling relay which when energized turns on an associated controlled transmitter, means responsive solely to said rectified noise output for energizing said relay in response to a predetermined decrease in the amplitude of said rectified noise output and for maintaining said relay deenergized in response to rectified noise output above a predetermined amplitude, and other means responsive solely to component failure in said receiver for maintaining said relay de-energized.

3. In a communication system, a receiver for frequency modulated waves, means for rectifying the noise output of said receiver, thereby developing in the output of said rectifying means a potential of predetermined amplitude in the absence of a carrier wave in said receiver and a potential of smaller amplitude in the presence of a carrier wave in said receiver, a locking circuit having two degrees of electrical stability and comprising a pair of electrode structures each including anode, cathode and grid electrodes, means cross-coupling the anode and grid electrodes of said structures through resistors, and a resistor common to the two cathode electrodes, a relay controlled by current flow in said electrode structures, and connections for applying said developed potential as a control voltage to said locking circuit to cause current flow in one structure and de-energization of said relay in response to a potential of said predetermind amplitude and to cause current flow in the other structure and energization of said relay in response to a potential of said smaller amplitude.

4. A communication system in accordance with claim 3, wherein said relay when energized turns on a transmitter to be controlled and when de-energized turns off such transmitter.

5. In a communication system, a receiver for frequency modulated waves, said receiver including a discriminator having a pair of diodes at the anodes of which are developed potentials of predetermined amplitudes when said receiver has normal sensitivity and potentials of smaller amplitudes when said receiver has unusable sensitivity, a relay, connections between said receiver and said relay for energizing said relay in the presence of a carrier wave in said receiver and for maintaining said relay de-energized in the absence of a carrier wave in said receiver, and means for utilizing one of said developed potentials to control the energization of said relay.

6. In a communication system, a receiver for frequency modulated waves, said receiver including a discriminator having a pair of diodes at the anodes of which are developed potentials of predetermined amplitudes when said receiver has normal sensitivity and potentials of smaller amplitudes when said receiver has unusable sensitivity, a transmitter-controlling relay which when energized turns on the controlled transmitter, connections between said receiver and said relay for energizing said relay in the presence of a carrier wave in said receiver and for maintaining said relay de-energized in the absence of a carrier wave in said receiver, and means for utilizing the change in one of said developed potentials, resulting from receiver failure, to maintain said relay de-energized.

7. In a communication system, a receiver for frequency modulated waves, said receiver including a discriminator having a pair of diodes at the anodes of which are developed potentials of predetermined amplitudes when said receiver has normal sensitivity and potentials of smaller amplitudes when said receiver has unusable sensitivity, means for rectifying the noise output of said receiver, a relay, means responsive to said rectified noise output for controlling the energization of said relay, and means for utilizing one of said developed potentials to control the energization of said relay.

8. In a communication system, a receiver for frequency modulated waves, said receiver including a discriminator having a pair of diodes at the anodes of which are developed potentials of predetermined amplitudes when said receiver has normal sensitivity and potentials of smaller amplitudes when said receiver has unusable sensitivity, a relay, a locking circuit having two degrees of electrical stability and comprising a pair of intercoupled electrode structures, so arranged that the flow of current in one structure causes a cessation of current in the other structure, and vice versa, coupling said receiver to said relay, thereby to control the energization of said relay in response to the output of said receiver, and means for utilizing one of said developed potentials to control the energization of said relay through said locking circuit.

9. In a communication system, a receiver for frequency modulated waves, said receiver including a discriminator having a pair of diodes at the anodes of which are developed potentials of predetermined amplitudes when said receiver has normal sensitivity and potentials of smaller amplitudes when said receiver has unusable sensitivity, means for rectifying the noise output of said receiver, a relay, a locking circuit having two degrees of electrical stability and comprising a pair of intercoupled electrode structures, so arranged that the flow of current in one structure causes a cessation of current in the other structure, and vice versa, coupling the output of said rectifying means to said relay, thereby to control the energization of said relay in response to said rectified noise output, and means for utilizing one of said developed potentials to control the energization of said relay through said locking circuit.

10. In a communication system, a receiver for frequency modulated waves, said receiver including a discriminator having a pair of diodes at the anodes of which are developed potentials of predetermined amplitudes when said receiver has normal sensitivity and potentials of smaller amplitudes when said receiver has unusable sensitivity, means for rectifying the noise output of said receiver, thereby developing in the output of said rectifying means a potential of predetermined amplitude in the absence of a carrier wave in said receiver and a potential of smaller amplitude in the presence of a carrier wave in said receiver, a locking circuit, having two degrees of electrical stability and comprising a pair of intercoupled electrode structures, so arranged that the flow of current in one structure causes a cessation of current in the other structure, and vice versa, a relay controlled by current flow in said electrode structures, connections for applying the potential developed in the output of the rectifying means as a control voltage to said locking circuit to cause current flow in one structure and de-energization of said relay in response to a potential of said last-named predetermined amplitude and to cause current flow in the other structure and energization of said relay in response to a potential of said last-named smaller amplitude, and means for applying one of the potentials developed at said anodes as a control voltage to said locking circuit to cause current flow in said one structure and de-energization of said relay in response to a change in the amplitude of said one developed potential from said first-named predetermined amplitude to said first-named smaller amplitude.

11. In a communication system, a receiver for radio waves, a relay, a locking circuit coupling said receiver to said relay, thereby to control the energization of said relay in response to the output of said receiver, said locking circuit having two degrees of electrical stability and comprising a pair of electrode structures each including anode, cathode and grid electrodes, means cross-coupling the anode and grid electrodes of said structures through resistors, and a resistor common to the two cathode electrodes, and means, including as a part thereof said locking circuit, for controlling the energization of said relay in response to component failure in said receiver.

12. In a communication system, a receiver for frequency modulated waves, a relay, a locking circuit coupling said receiver to said relay, thereby to control the energization of said relay in response to the output of said receiver, said locking circuit having two degrees of electrical stability and comprising a pair of electrode structures each including anode, cathode and grid electrodes, means cross-coupling the anode and grid electrodes of said structures through resistors, and a resistor common to the two cathode electrodes, and means, including as a part thereof said locking circuit, for maintaining said relay de-energized in response to component failure in said receiver.

References Cited in the file of this patent

UNITED STATES PATENTS

| | | |
|---|---|---|
| 2,156,809 | Fredrickson | May 2, 1939 |
| 2,287,926 | Zepler | June 30, 1942 |
| 2,316,902 | Trevor | Apr. 20, 1943 |
| 2,356,364 | Tice | Aug. 22, 1944 |
| 2,361,585 | Appel | Oct. 31, 1944 |
| 2,441,963 | Gray | May 25, 1948 |
| 2,459,675 | Noble | Jan. 18, 1949 |
| 2,487,513 | Beverage | Nov. 8, 1949 |
| 2,546,987 | Eannarino | Apr. 3, 1951 |
| 2,590,282 | Thompson, Jr. | Mar. 25, 1952 |